Oct. 3, 1939.　　　A. J. SACKETT　　　2,174,897
DRYING OR COOLING AND AERATING APPARATUS
Filed May 5, 1937　　　2 Sheets-Sheet 1
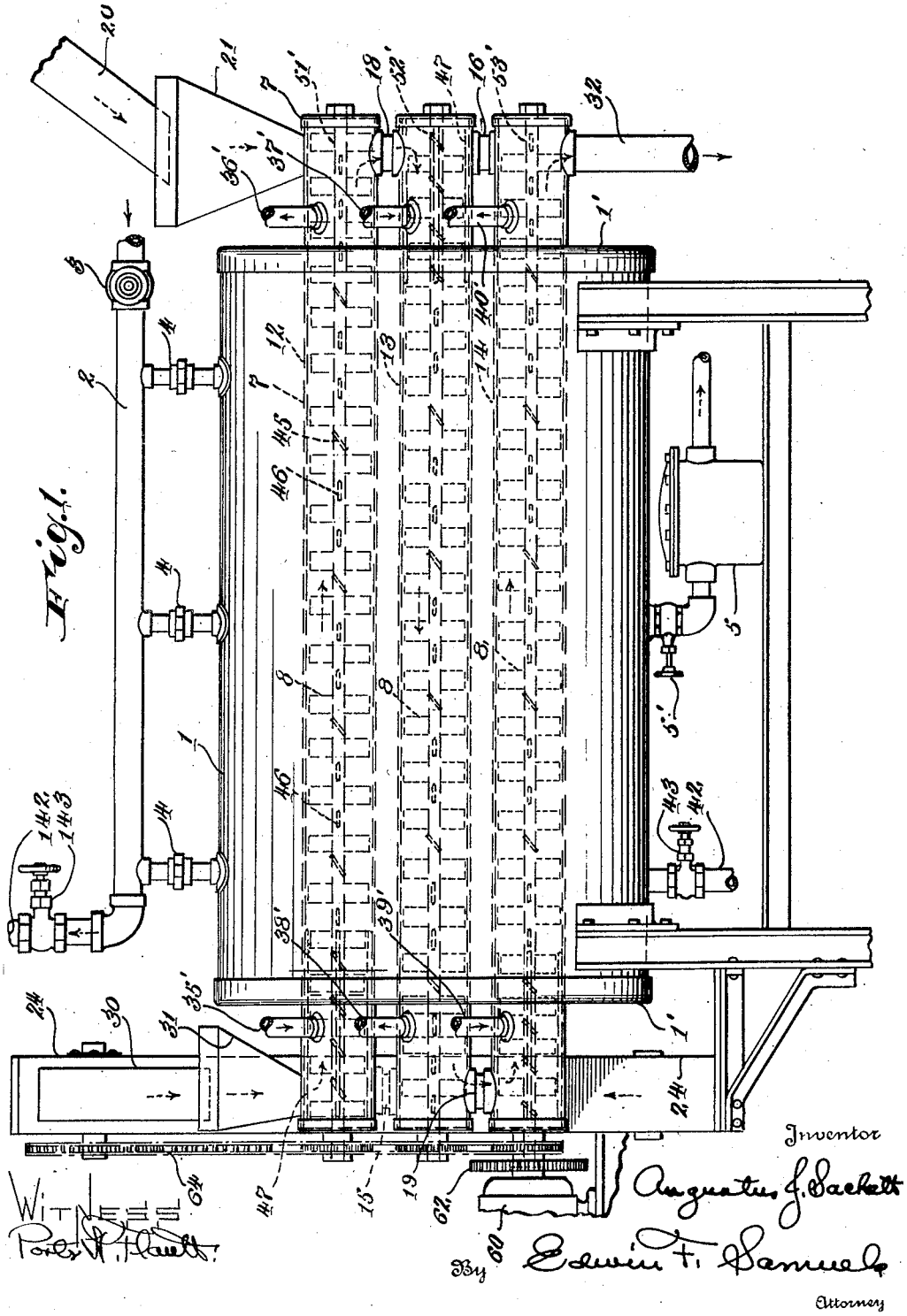

Oct. 3, 1939.　　　A. J. SACKETT　　　2,174,897
DRYING OR COOLING AND AERATING APPARATUS
Filed May 5, 1937　　　2 Sheets-Sheet 2
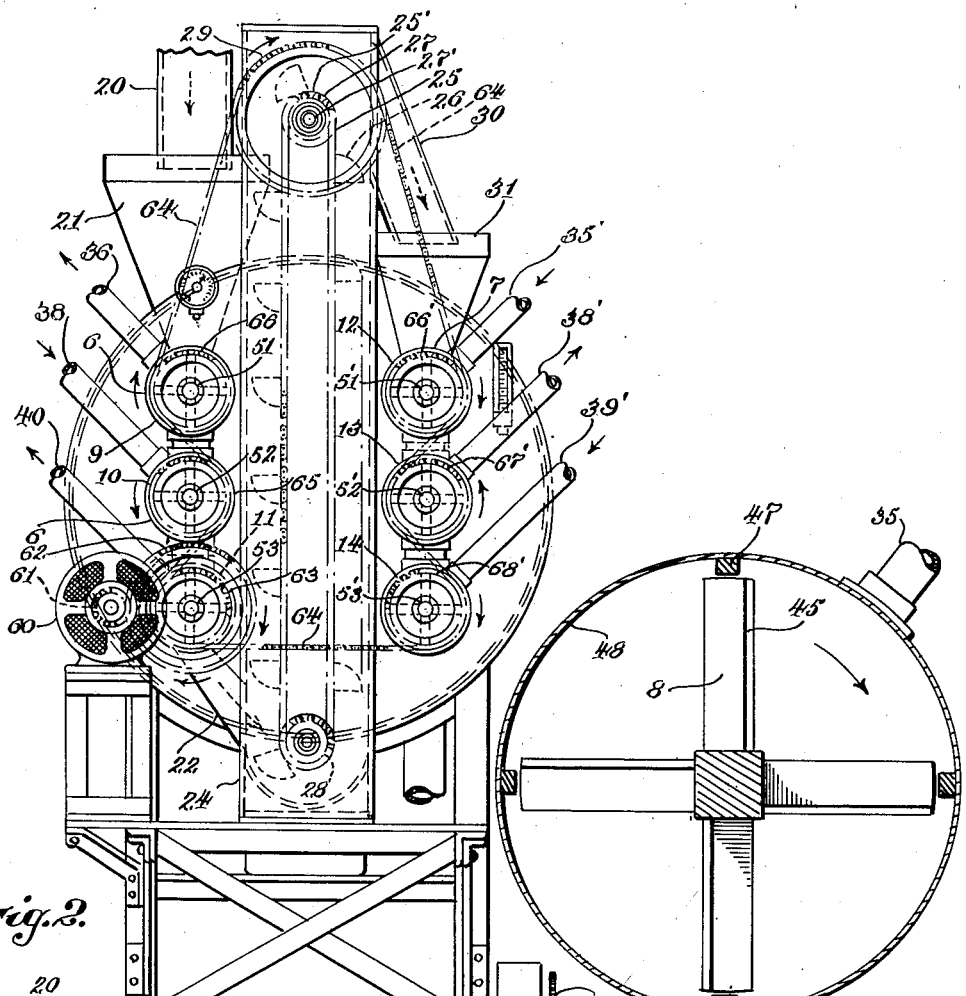
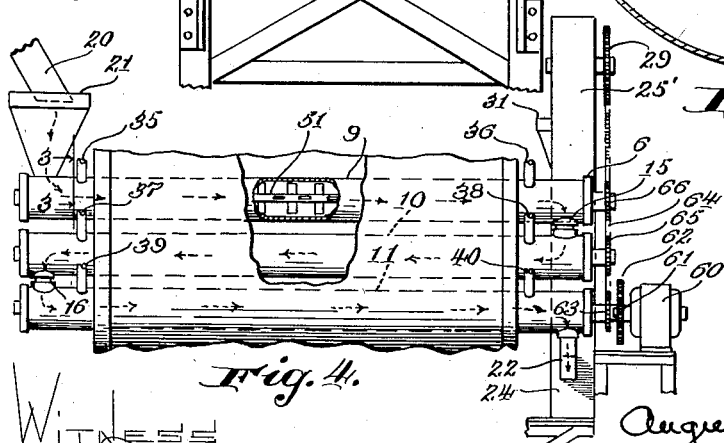

Patented Oct. 3, 1939

2,174,897

UNITED STATES PATENT OFFICE 2,174,897

DRYING OR COOLING AND AERATING APPARATUS

Augustus J. Sackett, Anne Arundel County, Md.

Application May 5, 1937, Serial No. 140,844

1 Claim. (Cl. 34—7)

The invention relates to a machine for drying or cooling fertilizer materials, mixed fertilizer and other materials as in the drying of crab shells, fish, tankage and the like and the machine also has particular advantages for use in the cooling of fertilizer after various mixing and combining processes in which there is a chemical reaction which leaves the material in a heated condition in which it is subject to deterioration by further chemical action which may be arrested by cooling saving such deterioration and also avoiding the delay due to waiting for seasoning or cooling of the material before delivery.

The machine in the preferred form also has the function of grinding or more properly cutting the materials reducing the size of the particles as in the treatment of fish, crab shells, tankage and the like, and it also provides for aeration in connection with the cooling and drying operations.

A further important advantage of the apparatus is that it is continuous in its operation and therefore wholly automatic. An advantage of the continuous operation with the beater and conveyor construction of the invention being that the materials are treated with absolute uniformity the entire product treated at any single adjustment, all particles of the material being thus subjected to a uniform degree of drying or cooling and aeration if the aeration feature be employed, aeration being an important function of which the machine is capable in connection with both the drying and cooling of the materials treated.

In the operation of the machine it is further an advantage that the materials as they are progressed through the machine are uniformly beaten against the walls of the conducting passages, tubes or coils so that all the particles are subjected to the maximum cooling or heating effect the walls of said passages being in contact on the outside and in heat exchanging relation with the heating or cooling medium in the drum which is an important agent in the operation of the machine.

In the accompanying drawings I have illustrated a machine embodying the features of the invention in what is at present regarded the preferred form.

In the drawings:

Figure 1 is a side elevation.

Figure 2 is an end elevation looking at the machine from the left in Figure 1 which is a view looking from the right in Figure 2.

Figure 3 is a section on an enlarged scale taken on the line 3—3 in Figure 4, showing one of the straight tubes or rectilinear tubes of one coil in cross section, with the conveyor blades in elevation.

Figure 4, is an elevation on a reduced scale looking from the left in Figure 2.

Referring to the drawings by numerals each of which is used to indicate the same or similar parts in the different figures, the construction shown comprises a drum 1 which is shown as cylindrical and is supplied with steam or cold water or other heating or cooling fluid by way of any suitable supply pipe, as the pipe 2 shown as controlled by a valve 3. The supply pipe 2 is preferably connected at various points by short connecting pipes 4 to the drum 1. At the bottom is shown a trap 5 for removing condensed water when the drum is heated by steam. This arrangement is particularly adapted to the use of steam, these or other connections as hereinafter described may be used for water or other fluids.

In accordance with the invention the material to be treated as aforesaid is conducted on an elongated path through the drum by way of any suitable number of coils 6, 7 through which the solid, semi-solid or more or less moist materials to be dried or cooled and/or aerated are progressed by mechanical beater conveyors 8.

There may be any number of coils or tubes suitably arranged to pass the materials through the drum. In accordance with the construction shown there are two coils 6 and 7 each of which consists of a series of straight tubes 9, 10, 11 composing coil 6 and 12, 13 and 14 composing the coil 7, the straight tubes or lengths of tubing in each coil being preferably arranged one above the other and in parallelism for convenience of arrangement and for convenience in connecting the shafts of the respective conveyors together for driving.

Figure 1 being a view looking from the right in Figure 2 shows the coil 7, the coil 6 being in the rear in said figure. Figure 4 shows the coil 6 in the front of the figure.

Each of the coils 6 and 7 as aforesaid comprises a series of straight tubes or tube lengths 9—11 comprising the coil 6 and 12—14 comprising the coil 7. These tubes in each coil are preferably one above the other. The tubes of each coil are connected in series at their ends, i. e. end to end to form the respective coils, by downwardly disposed passages 15, 16 in coil 6 and 18 and 19 in coil 7. To illustrate the manner of connecting the straight tubes or lengths of tubing it is noted that the material is fed in any suitable manner as by way of a feed pipe 20 and hopper 21 to the left hand end of the upper straight tube 9 of coil 6 as these tubes are seen in Figure 4 the material being as hereinafter described passed along tube 9 and then downwardly through the passage 15 to tube 10 where it is fed to the left through tube 10 and passed downwardly through the passage 16 at the left end of tube 10 to tube 11 being then fed to the right through tube 11.

Having further reference to Figure 4; the material is discharged from the right hand end of tube 11 by way of a downwardly disposed or inclined discharge pipe or chute 22 or any suitable discharge means. This, in the form of invention shown discharges into the bottom of an elevator casing 24 in which is located an upright conveyor chain 25 carrying elevator buckets 26 or any suitable transfer means may be employed. This conveyor as shown has its upward traverse at the left as seen in Figure 2, the chain passing over sprocket 27 at the top and 28 at the bottom. The top sprocket 27 as shown is the same shaft with or otherwise secured to sprocket 29 to be further described, and is driven thereby. The buckets 26 discharge at the top into a chute 30 which delivers to a hopper 31 which in the form of the invention shown feeds into the left end, see Figure 1, of the upper straight tube 12 of the coil 7 the material being passed through said tube toward the right end of said tube as shown in Figure 1 and delivered from the right end of said tube by way of downwardly disposed passage 18 to the right hand end of the tube 13 of said coil along which it is passed to the left in said figure, and through said tube being delivered downwardly at the left end of said tube by way of passage 19 to the tube 14. From the left end of the tube 14 the material is passed to the right along said tube and discharged downwardly at the right end of said tube, Figure 1, by way of discharge pipe 32. From the above description it will be apparent that the tubes 9, 10, 11, 12, 13 and 14 are connected together in series so that the material may be passed therethrough from one end to the other end of the coil. In this connection it should be understood that the arrangement shown is the preferred form, other arrangements of tubes in the coils and of coils in the jacket, other types of jacket, conveying and driving means, etc., being contemplated.

As an additional means for drying and aerating the materials in the form of the invention shown, the straight tubes of each coil are provided or the coils 6 and 7 may be otherwise provided with air pipes shown at each end of each straight tube 9—14 for passing air through said tubes. This is preferably heated air when the machine is used for drying and 's preferably cool air when the machine is used for cooling and aeration. In the form of the invention shown the coil 6 is provided as to the tube 9 with an inlet air pipe 35 at the left in Figure 4 and an outlet air pipe 36 at the right in Figure 4, and tube 10 is provided with an inlet air pipe 37 at the right in Figure 4 and an outlet air pipe 38 at the left in said figure, the tube 11 being provided with an inlet air pipe 39 at the left in Figure 4 and an outlet air pipe 40 at the right in said figure. The coil 7 (see Fig. 1) is provided with corresponding inlet and discharge air pipes 35', 36', 37', 38', 39' and 40'. The air in both instances being passed through the tubes preferably in the same direction as that in which the material is fed in a manner to be described though the relation between the direction of feeding and further, aeration is not absolutely essential to all purposes to which the apparatus is applied, aeration being accomplished in other ways.

In the form shown tubes 9, 10, 11, 12, 13 and 14 extend from end to end of the drum or jacket parallel to the axis of the drum and for convenience in feeding the material to the coils discharging it therefrom transferring the material from one coil to the other as well as in driving the beaters and conveyors and introducing and discharging the air for aeration the said tubes 9—14 are shown as extending outside the drum, through the heads at both ends and these various means to be described are located outside the drum. These and other features may be otherwise arranged. It is also of interest that the tubes 9—14 are shown as connected for passing the material downwardly at their ends as herein after described near transverse vertical planes which may be represented by the drum heads 1', it being further understood that while the tubes are preferably horizontal they may be arranged at any angle which does not interfere with the transfer of the material from one straight length to the other at or near their ends.

An important feature of the invention resides in the provision of mechanical conveyor beaters in each straight tube or rectilinear section 9—14 of the respective coils 6 and 7 whereby the material to be dried or cooled and/or aerated is projected against the walls of the tubes for more efficient treatment in heating or drying and cooling and aerating, by contact of said tubes in heat exchanging relation with the heating or cooling agent in the drum 1, it being understood that the heating or cooling agent is maintained at the desired temperature by thermostatic control or by continuous circulation when steam is used, it is fed to the drum by way of pipes 2—4 and discharged at the bottom by way of trap 5 in the form of condensed steam. When the drum is cooled by water the valve 3 is closed and valve 143 is opened, thus utilizing pipes 4, 2, and 142 for the discharge of the water which is introduced by way of pipe 42 at the bottom, the valves 43 and 143 being open when water is used in the drum and closed when steam is used.

In addition to the beating function, the rotary members also have a conveying function which, in the form of the invention shown, is accomplished by helically inclined conveyor blades 45 of which, in the form of the invention illustrated, there is one to every two of the beater blades 46. These blades may be varied as desired to give the desired direction and speed of the feeding motion and the desired degree of beating and they may be variously formed. It is also of interest that at the intake end of each tube there is provided a series of stationary cutter members 47 spaced about the periphery of the tube and extending along the tube substantially in the direction of the axis. The ends of the conveyor blades 45 and the beater blades 46 terminate in close relation to said stationary cutters. Beyond the cutters the blades 45 and 46 project into close relation with the inner walls 48 of the tubes.

The cutters 47 which may be placed as desired are not essential to the operation of the other features of the apparatus but are of importance in cutting crab shells and the like and other relatively large particles which may be presented to the machine for reduction in size; i. e., for cutting as well as for drying, and they also serve a useful function in the reduction of the size and prevention of caking of other material treated in the machine.

The beater and conveyor blades or other beater and conveyor means are mounted on shafts 51, 52, 53 in the respective tubes of the coil 6 and correspondingly by shafts 51', 52', 53' in the straight tubes of the coil 7. In the form of the invention shown, the beater shafts and the conveyor are driven by an electric motor 60 on the shaft of which is a small pinion 61 which meshes with a gear 62 on the shaft 53, driving said shaft and the beater and conveyor in tube 9. This shaft carries a sprocket 63 which drives a chain 64 which meshes with sprocket 65 on the shaft 52 and with sprocket 66 on the shaft 51, driving the respective beater shafts 52, 51 in tubes 10 and 11. This chain passes upwardly over the sprocket 29 which drives the shaft 27' and sprocket 27 and hence the elevator 25', and from sprocket 29 it passes downwardly about sprockets 66', 67', 68' on the respective conveyor and beater shafts 51', 52', 53, driving these shafts and the conveyors and beaters thereon in the respective tubes 12, 13, and 14 of the coil 7. The reference in the claim to straight lengths of tubing or straight tubes is not intended to imply that these lengths must be separate pieces of tubing, as it is immaterial whether the coils be in one or more pieces.

In the operation of the machine, if it is to be used for drying, steam or hot water may be fed by way of the pipe 2; or, if it is to be used for cooling, cold water or even refrigerant may be supplied to the drum, water or other cooling agent being preferably introduced at the bottom by way of pipe 42 and discharged by pipe 142, valve 143 being used to control the circulation. In the use of steam, the condensed water is discharged, the steam being trapped at 5 according to the usual practice, there being a valve 5' which is closed during the circulation of water but is also used to drain the water from the drum. All said pipes are valve-controlled so the operator may suit the circulation to the particular cooling or heating medium and the particular process being performed, it being understood that the temperature of the medium in the drum and the circulation thereof may be controlled according to any method suitable to this purpose with whatever degree of exactness may be thought desirable and either automatically or by hand.

The material to be treated is fed continuously by way of the feed pipe 20 to the hopper 21 or other device for leading the material to the upper end or otherwise to the infeed end of the coil 6 which in the particular form shown is in front in Figure 4 and at the left in Figure 2, the hopper 21 being at the rear in said latter figure. In operation the shafts 51, 52, 53, 51', 52', 53' are preferably driven at 150–175 revolutions per minute so that the action of the beater blades at 46 which are preferably flat in a radial plane of the axis and the conveyor blades which are helically arranged to advance the material from end to end through the coils as explained also have the effect, particularly as to the beater blades, of keeping the bulk of the material in contact with the walls of the tubes. Thus it obtains the full heating or cooling effect of the heating or cooling medium in the drum which is in direct contact with the outer walls of the tubes which may be made as thin as the rigidity required will permit and of a highly heat conductive material. It is to be understood in this connection that the thickness of the layer of material thus spread over the walls of the tubes will vary to some degree with the rate of feed but that there is a continuous change of contact so that all of the particles of material being treated will be brought repeatedly and in rapid succession in close contact with the walls of the tubes which are as foresaid in close heat exchanging relation with the heating or cooling medium in the drum and that this heating or cooling medium is supplied at a sufficient rate to maintain the desired temperature in the drum within the desired or any predetermined degree of variation. It is also to be noted that any desired rate of progress of the material through the tubes can be obtained not only by changing the speed of rotation but by changing the number of conveyor blades in relation to the beater blades or the angle of the same or by varying the angle of the beater blades with the axis of the tubes the location of the plane of the beater blades in radial planes of the axis as shown being considered preferable. A considerable variation of conveyor and beater blades or the substitution of other means therefor is contemplated.

It is of interest that in addition to the treatment of mixed fertilizer, crabs or crab shells, fish, tankage and the like, the apparatus may be used in drying brewers' grain, chicken manure and other materials and the heat vehicle may be steam, hot water, cold water or hot or cold air. The drum may contain any number of coils or straight tubes connected to form a coil, an elevator or other conveyor being used to transfer the material from one coil to the other, or if desired the coils may be operated in parallel. The arrangement shown with the coils spaced apart has advantages in providing extra steam space thus giving greater heat capacity.

In the operation as aforesaid the material as it is dried or cooled and beaten and aerated hot or cold air being preferably passed through the tubes being admitted and discharged by pipes 35—40 and 35'—40' the material in coil 6 passes along tube 9 and downwardly by way of passage 15 to the tube 10 along which it moves to the left hence by way of passage 16 to the straight tube 11 along which it passes to the right being continuously beaten and treated and conveyed through all said tubes as indicated by the arrows therein, being then led by way of the chute 22 to the conveyor 25' by which it is raised and delivered to the upper end of the coil 6 by way of chute or funnel 31 and delivered to the upper end of the coil 7 along which it is passed as previously described being beaten and conveyed and aerated in the manner described as to the coil 6 and finally discharged at 32 after being completely beaten, aerated, cut and dried or cooled with the possible variations of this treatment already suggested.

The process described may be applied to the drying and cutting or grinding of crab shells, fish, tankage or other fertilizer materials and to the aeration of these materials in drying, aeration being a feature which may be omitted. It may also be applied to the drying and mixing and aeration and to the cooling and aeration of fertilizer materials. Particularly, it may be applied to the cooling and aeration of fertilizer materials recently mixed and being in a heated condition due to chemical reaction. Such materials it is found desirable to cool and aerate to prevent further chemical reaction and to render the fertilizer suitable for handling and delivering, it being a known difficulty with such fertilizers when after mixing they must be permitted to cool for a considerable period before they are suitable for handling. By the present apparatus the materials are quickly cooled and the fertilizer value is preserved whereas the further reaction which is thus arrested has a most undesirable effect in the deterioration of the fertilizer the present apparatus serving to not only prevent this deterioration but to avoid the delay previously encountered in delivering these materials after mixing. It is of further advantage in the present apparatus that it is continuous in its operation and capable of automatic feeding avoiding the expense of labor and the loss of time in measuring batches of material, batch treatment being much more expensive not only on account of the labor, weighing and measuring but on account of the loss of time incident to the apparatus being idle while the measuring operation is carried on. An important feature of the invention is the accurately controlled continuous treatment of these and other materials in drying or cooling and/or aerating.

I have thus described an apparatus embodying the features of my invention and the method of drying and aerating in accordance with said invention, the description being specific and in detail in order that the manner of constructing, applying, operating and using the invention may be fully understood, however, the specific terms herein are used descriptively rather than in a limiting sense the scope of the invention being defined in the claim.

What I claim as new and desire to secure by Letters Patent is:

In a machine for drying and cooling fertilizer and other materials, an elongated horizontal drum having a cylindrical body portion and head members at each end thereof, means for supplying a tempering medium to said drum, a pair of imperforated tube sets, said tube sets being substantially straight and sealed within the head members adjacent their ends for preventing the escape of the tempering medium from the drum about said tubes, said tube sets being arranged on opposite sides of a vertical plane passing through the center of said drum, the said tubes of each set being arranged at different levels and connected in series and downwardly at their adjacent alternate ends to feed by gravity from one tube to the other, material feeding means at the infeed end of the upper tube of one of the tube sets, a conveyor and beating means within each tube of each set extending longitudinally of the same, said conveyor and beating means adapted to beat the material and convey it along and through all the tubes of each set from their infeed ends to their discharge ends, a vertical elevator extending upwardly outside and adjacent one end of the drum and between the two sets of tubes, means connected with the discharge end of the lower tube of the first mentioned set for depositing the material in the lower end of the elevator, means at the upper end of the elevator for directing the material into the infeed end of the upper tube of the second set of tubes, means at the discharge end of the lower tube in the second set for discharging the material from the dryer, air inlets at one end of each of the tubes and air outlets at the opposite ends thereof for supplying and exhausting the air in each of the individual tubes, power operated means, and means connected with said power operated means and each of the conveying and beating means in the respective tubes and with the said elevator comprising, continuous flexible power transmission means.

AUGUSTUS J. SACKETT.